United States Patent
Yang

(10) Patent No.: US 10,642,427 B2
(45) Date of Patent: May 5, 2020

(54) TOUCH SYSTEM AND POWER SUPPLY CIRCUIT THEREOF

(71) Applicant: Shenzhen Goodix Technology Co., Ltd., Shenzhen, Guangdong (CN)

(72) Inventor: Meng-Ta Yang, Taipei (TW)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/942,580

(22) Filed: Apr. 2, 2018

(65) Prior Publication Data
US 2018/0224972 A1 Aug. 9, 2018

Related U.S. Application Data

(63) Continuation of application No. PCT/CN2016/113310, filed on Dec. 29, 2016.

(51) Int. Cl.
| | |
|---|---|
| G06F 3/044 | (2006.01) |
| G05F 1/10 | (2006.01) |
| G06F 3/041 | (2006.01) |

(52) U.S. Cl.
CPC .............. *G06F 3/044* (2013.01); *G05F 1/10* (2013.01); *G06F 3/0416* (2013.01)

(58) Field of Classification Search
CPC ........... G06F 3/044; G06F 3/0416; G05F 1/10
See application file for complete search history.

(56) References Cited

U.S. PATENT DOCUMENTS

| | | | |
|---|---|---|---|
| 8,411,062 B1 | 4/2013 | Ellis | |
| 2008/0162996 A1* | 7/2008 | Krah | G06F 1/3203 |
| | | | 714/27 |
| 2010/0060610 A1 | 3/2010 | Wu | |
| 2013/0135245 A1 | 5/2013 | Rai | |
| 2013/0181946 A1* | 7/2013 | Lee | G06F 3/044 |
| | | | 345/174 |
| 2015/0355749 A1 | 12/2015 | Min | |
| 2016/0364040 A1* | 12/2016 | Hao | G06F 3/044 |

(Continued)

FOREIGN PATENT DOCUMENTS

| | | |
|---|---|---|
| CN | 101833406 A | 9/2010 |
| CN | 103577007 A | 2/2014 |

(Continued)

*Primary Examiner* — Lunyi Lao
*Assistant Examiner* — Jarurat Suteerawongsa
(74) *Attorney, Agent, or Firm* — Winston Hsu

(57) ABSTRACT

The present application provides a power supply circuit, including a high voltage circuit, for providing a high voltage signal; and a first level shifter, connected to the high voltage circuit, for transforming a level of a first signal transmitted from a touch module to the power supply circuit, and transforming the first signal from a signal ground domain into a ground domain; and a second level shifter, connected to the high voltage circuit, for transforming a level of a second signal between the touch module and a host system, and transforming the second signal from the signal ground domain into the ground domain, and then from the ground domain into the signal ground domain. The power supply circuit provided by the present application is capable of transforming the signal between the touch module and the host system, improving the SNR of the touch module, and decreasing the manufacturing cost.

14 Claims, 5 Drawing Sheets

(56) References Cited

U.S. PATENT DOCUMENTS

2017/0046004 A1* 2/2017 Choi .................... G06F 3/0418
2017/0160833 A1 6/2017 Han

FOREIGN PATENT DOCUMENTS

| CN | 105138203 A | 12/2015 |
| CN | 105511697 A | 4/2016 |
| CN | 105912180 A | 8/2016 |
| KR | 10-2009-0113127 A | 10/2009 |
| WO | 2015/199272 A1 | 12/2015 |
| WO | 2016/195388 A1 | 12/2016 |

* cited by examiner

TOUCH SYSTEM AND POWER SUPPLY CIRCUIT THEREOF

CROSS REFERENCE TO RELATED APPLICATIONS

The present application is a continuation of international application No. PCT/CN2016/113310, filed on Dec. 29, 2016, which is incorporated herein by reference in its entirety.

FIELD OF THE INVENTION

The present application relates to a touch system and power supply circuit thereof, and more particularly, to a power supply circuit capable of transforming voltage signal and improving signal-to-noise ratio (SNR) of a touch module and to a touch system adopting the power supply circuit.

BACKGROUND

With the progress and development of technology, mobile phones, digital cameras, tablet computers, laptops and mobile electronic devices have become indispensable tools to human life. In order to achieve a more efficient working way, touch devices have been utilized in all kinds of electronic devices, for example, inductive and capacitive touch devices. However, conventional capacitive touch devices often utilize self-capacitive detection to improve accuracy of mutual capacitance detection or add waterproof function thereto. However, to improve Signal to Noise Ratio (SNR), a high voltage process is normally utilized to design integrated circuit (IC), which may cause substantial increment oncost of manufacturing the touch module.

Therefore, how to provide a power supply circuit and touch system thereof capable of transforming signals and improving the SNR and reducing the cost of manufacturing the touch module has become one of objectives in the field.

SUMMARY

Therefore, one major objective of the present invention is to provide a power supply circuit and touch system thereof capable of transforming signal and improving the SNR of the touch system.

To solve the above mentioned technical problems, the present application provides a power supply circuit, the power supply circuit includes a high voltage circuit for providing a high voltage signal; and a first level shifter connected to the high voltage circuit, for transforming a level of a first signal transmitted from a touch module to the power supply circuit, and transforming the first signal from a signal ground domain into a ground domain; and a second level shifter, connected to the high voltage circuit, for transforming a level of a second signal between the touch module and a host system, and transforming the second signal from the signal ground domain into the ground domain, and then from the ground domain into the signal ground domain.

Preferably, a signal of a ground terminal of the touch module is a high voltage reference signal from the power supply circuit.

Preferably, the power supply circuit is configured for providing a power source for the touch module, wherein a fixed level difference exists between the high voltage reference signal of the power supply circuit and a working signal of the power supply circuit.

Preferably, the power supply circuit further includes an amplifier, connected to the first level shifter, for amplifying a voltage of the first signal, and amplifying a swing of the first signal to a swing of high voltage; and a regulator circuit, connected to the amplifier, for regulating voltage of the touch module and the power supply circuit.

To better solve the above mentioned technical problems, a touch system is also provided, the touch system includes a touch module configured to generate a signal according to a floating ground signal; a host system, connected to the touch module, configured to receive the signal transmitted from the touch module; and a power supply circuit, connected between the touch module and the host system, the power supply circuit includes: a high voltage circuit, configured to provide a high voltage signal; a first level shifter, connected to the high voltage circuit, configured to transform a level of a first signal transmitted from the touch module to the power supply circuit, and transform the first signal from a signal ground domain into a ground domain; and a second level shifter, connected to the high voltage circuit, configured to transform a level of a second signal between the touch module and the host system, and transform the second signal from the signal ground domain into the ground domain, and then from the ground domain into the signal ground domain.

The power supply circuit and the touch system thereof provided by the present application is capable of transforming the signal and improving the SNR of the touch module, since only the power supply circuit is needed to be manufactured under a high voltage process, which has an advantage of substantially decreasing the cost of manufacturing the touch module under the high voltage process.

DETAILED DESCRIPTION

In order to make the objects, technical solutions and advantages of the present application become more apparent, the following relies on the accompanying drawings and embodiments to describe the present application in further detail. It should be understood that the specific embodiments described herein are only for explaining the present application and are not intended to limit the present application.

Figure 1:
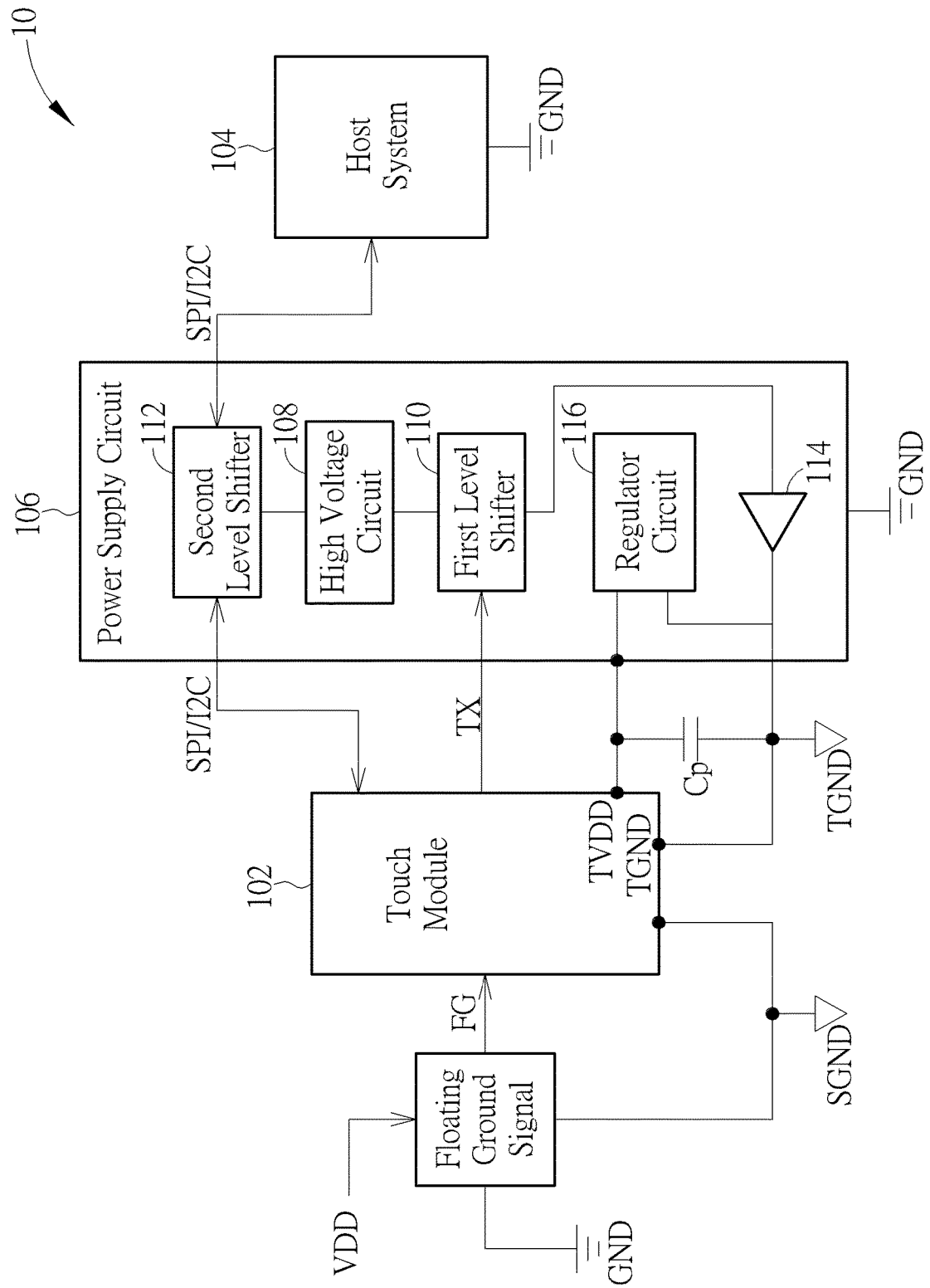
FIG. 1 is a schematic diagram of a touch system according to an embodiment of the present application.

Please refer to FIG. 1, which is a schematic diagram of a touch system according to an embodiment of the present application. The touch system 10 includes a touch module 102, a host system 104 and a power supply circuit 106. The touch module 102 is utilized for receiving a finger touch, where the finger touch may be equivalently regarded as a floating ground signal FG, thus to generate a signal of capacitance variation. For example, a touch panel has a touch sensor including a plurality of electrodes, and when the finger touches the touch panel and causes the variation of capacitance, a touch controller of the touch module 102 detects the capacitance variation, and thereby whether the electrode is touched can be determined. The host system 104 is connected to the touch module 102 for receiving signal of the touch module 102; for example, the host system 104 may be implemented by a tablet computer or a portable electronic device, such that the touch system 10 communicates with the host system 104, i.e., the tablet computer or the portable electronic device, based on the signal of the touch module 102. The power supply circuit 106 is connected between the touch module 102 and the host system 104, and it is configured for driving the touch module 102 with a high voltage signal, and providing a power source for the touch module 102. Therefore, the touch module is not necessary to be manufactured under the high voltage process, but by the high voltage signal of the power supply circuit to achieve higher SNR.

Specifically, the power supply circuit 106 may be utilized for supplying the power source for the touch module 102, and it includes a high voltage circuit 108, a first level shifter 110, a second level shifter 112, an amplifier 114 and a regulator circuit 116. The high voltage circuit 108 is connected to the first level shifter 110 and the second level shifter 112, for providing the high voltage signal (e.g. around 15V high voltage signal) for the power supply circuit 106. Since the finger touch can be equivalently regarded as the floating ground signal FG, a ground of the touch module 102 varies with a voltage level of the finger touch. Thus, when the touch sensor of the touch module 102 senses the capacitance variation and generates the voltage level of a signal Tx, the first level shifter 110 is utilized for transforming the voltage level of the signal Tx, which is transmitted from the touch module 102 to the power supply circuit 106, and transforming the signal Tx from a signal ground (SGND) domain into a ground (GND) domain, such that the power supply circuit 106 receives the same voltage level with the signal Tx from the touch module 102, wherein the GND domain is an earth ground, which is well known to those in the art. In other words, the first level shifter 110 of the power supply circuit 106 transforms the voltage level of the signal of the touch module 102, so as to transmit the signal between the touch module 102 and the power supply circuit 106 of different voltage levels.

In addition, in order to make the voltage level of the signal of the touch module 102 to consistent with level of signal of the host system 104, the second level shifter 112 is utilized for transforming a voltage level of a communication signal between the touch module 102 and the host system 104. The second level shifter 112 is configured to transform the signal, which is output from the touch module 102, from the SGND domain into the GND domain, and then transform the communication signal from the GND domain into the SGND domain. For example, the touch module 102 may perform the transmission of the communication signal with the host system 104 via Serial Peripheral Interface (SPI) or Inter Integrated Circuit Communications (I2C) bus. However, since the voltage levels of the touch module 102 and the host system 104 are different, the present application utilizes the signal transformation of the second level shifter 112 to perform the transmission of the communication signal between the touch module 102 and the host system 104. The amplifier 114 is connected to the first level shifter 110, for amplifying the signal Tx output from the first level shifter 110 to a high voltage reference signal TGND, that is, amplifying a swing of the signal Tx to a swing of high voltage, and the signal Tx is regarded as the signal source of a ground terminal of the touch module 102. In this example, the first level shifter 110 and the amplifier 114 may not only be respectively implemented by different components, but also implemented by a single component to perform functions of the voltage signal transformation and the voltage amplifying, but not limited thereto. In addition, the regulator circuit 116 is connected to the touch module 102 and the amplifier 114, and may be connected to an external power source (e.g. 2.8V or 3.3V and so on) for maintaining a stable status of two terminals of a capacitor Cp. That is, the regulator circuit 116 may maintain the voltage between the touch module 102 and the power supply circuit 106. In this way, the power supply circuit may not only provide the power source for the touch module, but also transform and stabilize the internal voltage level of the touch system 10, and provide the high voltage signal for the touch module so as to improve the SNR of the touch module.

More specifically, in an embodiment, when a finger of a user touches a capacitive touch device, since the finger is equivalent to an earth ground of the circuit, it is equivalent to transmitting the floating ground signal FG via the finger to a receiver of the touch module 102. Then, the touch module 102 may determine a location where the touch locates according to the capacitance variation generated when the finger touches. In addition, the touch module 102 may transmit the signal Tx to the power supply circuit 106, the first level shifter 110 transforms the voltage level of the signal Tx, and then the amplifier 114 outputs the high voltage reference signal TGND as the signal source of the ground terminal of the touch module 102. In addition, since the finger is equivalent to the ground of the circuit, if the SGND of the touch module 102 is floating, with respect to the touch module 102, the hand is equivalent to emitting the high voltage signal. Therefore, the touch module 102 may determine whether a human touches or not according to the received signal. Moreover, since the signal is the high voltage signal, it improves the SNR of the touch module 102. Notably, since the signal of the first level shifter 110 is provided by the high voltage circuit 108, after the signal Tx passes through the first level shifter 110 and the amplifier 114, the output high voltage reference signal TGND is the high voltage signal. Therefore, the signal source of the ground terminal of the touch module is the high voltage signal, and is free from the high voltage process technique to design the touch module and substantially decreases the manufacturing cost.

Figure 2:
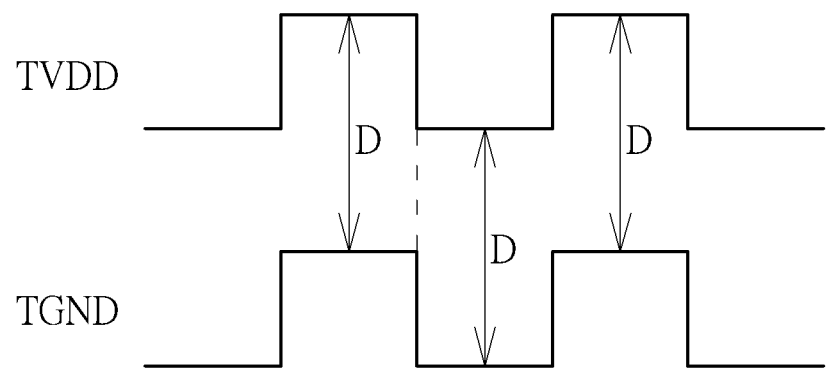
FIG. 2 is a comparative diagram of a working signal of a power supply circuit and a high voltage reference signal in operation according to an embodiment of the present application.

Please refer to FIG. 2, which is a comparative diagram of a working signal TVDD of the power supply circuit 106 and the high voltage reference signal TGND in operation according to an embodiment of the present application. As can be known in FIG. 2, the first level shifter 110 may maintain a fixed level difference D between the working signal TVDD and the high voltage reference signal TGND of the power supply circuit 106, so as to achieve the objective of transforming the signal. Similarly, the second level shifter 112 may be utilized for transforming the communication signal transmitted via the SPI/I2C bus between the host system 104 and the touch module 102. Therefore, the second level shifter 112 of the power supply circuit 106 may also be utilized for maintaining the voltage between the touch module 102 and the host system 104. Besides, since an area the power supply circuit 106 manufactured under the high voltage process is smaller than an area of the touch module 102, and the power supply circuit 106 is easier to achieve under the high voltage process than the touch module 102. Therefore, the present application may effectively decrease areas and volumes of applied devices, and further decrease the manufacturing cost. In this way, by utilizing the high voltage reference signal provided by the high voltage circuit of power supply circuit as the signal source of the ground terminal of the touch module, the manufacturing cost is decreased, and the SNR of the touch module is improved.

Figure 3:
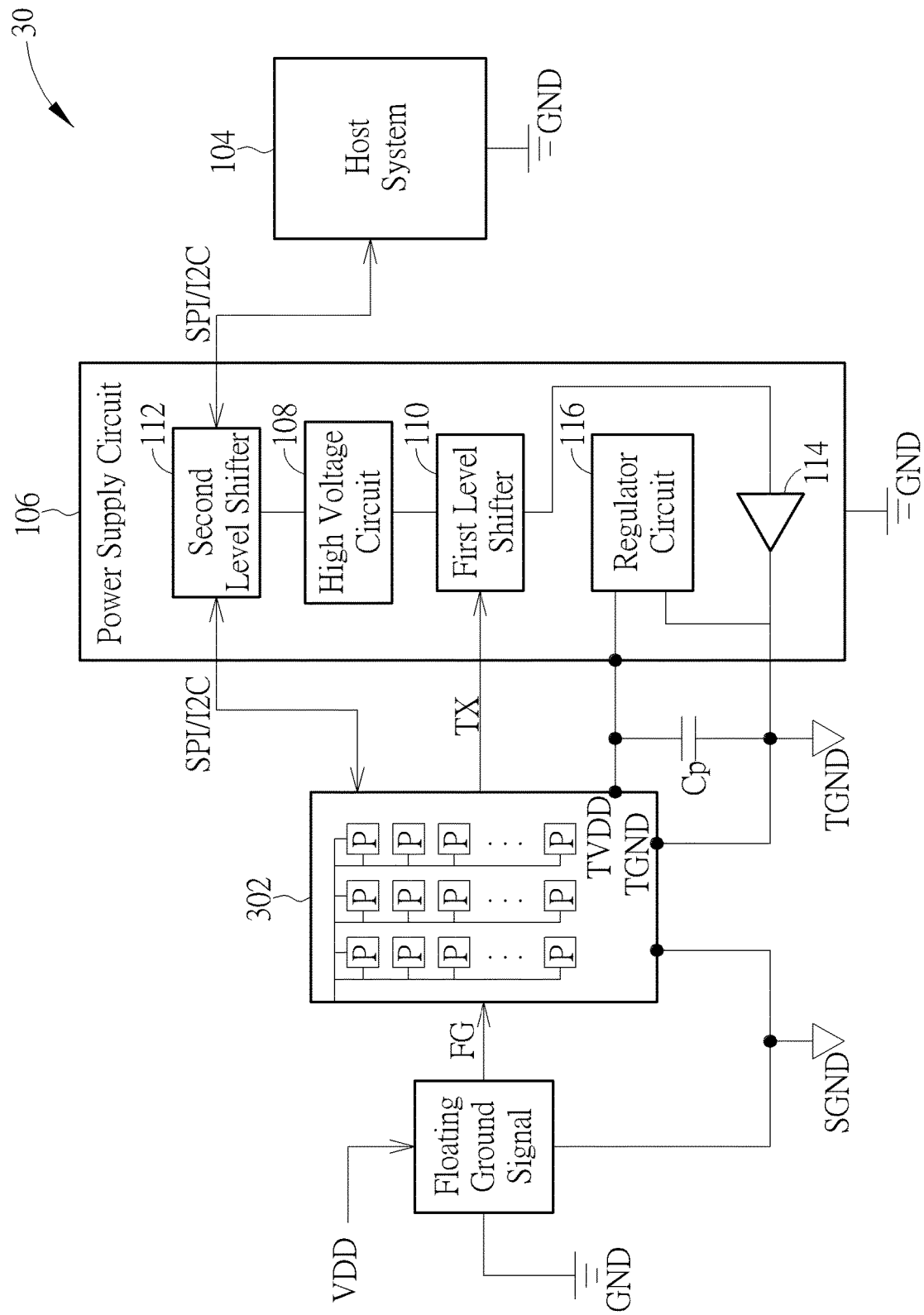
FIG. 3 is a schematic diagram of another touch system according to an embodiment of the present application.
Figure 4:
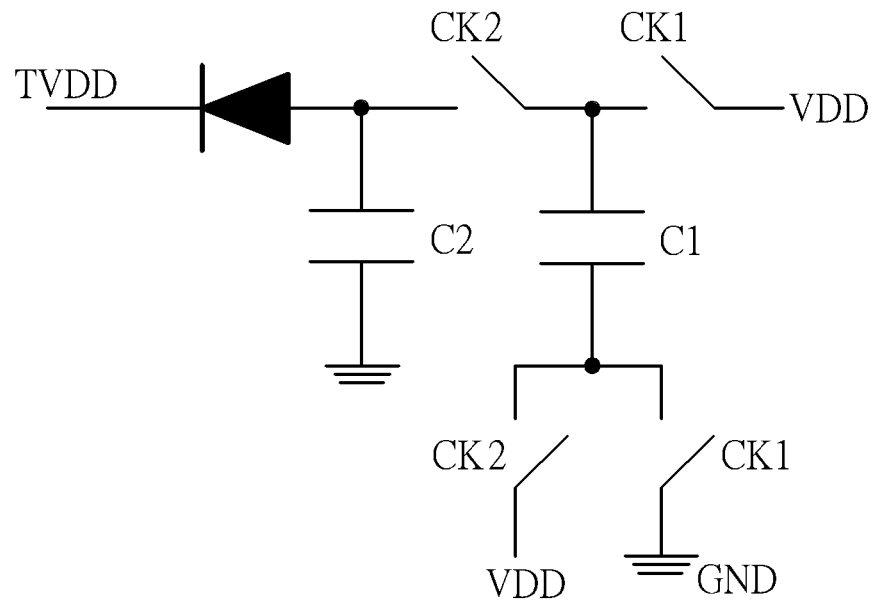
FIG. 4 is a schematic diagram of a power supply circuit according to an embodiment of the present application.
Figure 5:
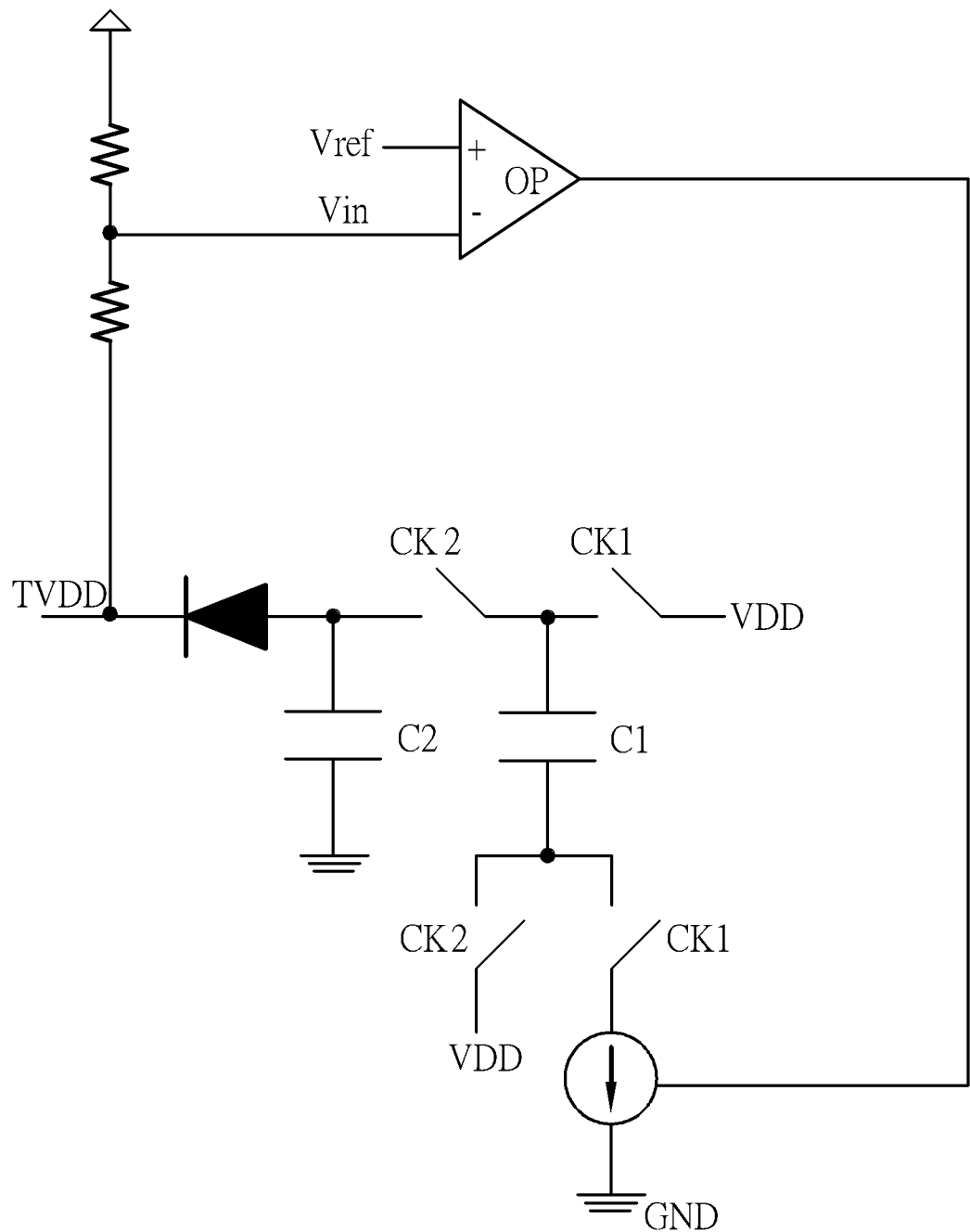
FIG. 5 is a schematic diagram of another power supply circuit according to another embodiment of the present application.

Note that, the embodiments stated above are utilized for illustrating the spirit of the present application, those skilled people in the art may make modifications and alternations, and not limited thereto. For example, the touch device adopted in the present application may not only be implemented by a single touch technique, but also be implemented by a bitmap touch device, e.g. a touch panel of Indium Tin Oxides (ITO) is utilized for achieving an effect of multi-points touch. As shown in FIG. 3, it is a schematic diagram of a touch system 30 according to another embodiment of the present application. Different from the touch system 10, the touch system 30 achieves the multi-points touch through the finger, equivalent to the ground in a circuit, touches a touch module 302 with pixel units P of the 3*n ITO matrix. Or, a charge pump may be an example of the power supply circuit according to an embodiment of the present application. For example, please refer to FIG. 4 and FIG. 5, which are examples of the power supply circuits according to other embodiments of the present application. As shown in FIG. 4, capacitors C1 and C2 of internal circuit of a capacitive charge pump can be used to store energy, and switches CK1 and CK2 are alternatively switched on and switched off to perform a voltage transformation between DC (direct current) and DC. That is, when the switch CK1 is switched on, a voltage VDD charges the capacitor C1; and when the switch CK1 is switched off and the switch CK2 is switched on, the voltage VDD charges the capacitor C2, such that the capacitive charge pump may be one of implementations of the power supply circuit of the present application. In another embodiment, please refer to FIG. 5, different from FIG. 4, FIG. 5 further adds a non-inverting closed loop operational amplifier as one of the implementations of the power supply circuit, but should not limited thereto, all devices capable of implementing the charge pump are suitable for the present application. In addition, the power supply circuit may not only simultaneously transform the signal between the touch module and the host system and provide the high voltage signal for the touch module, but also can be utilized in all kinds of systems to individually provide functions of transforming circuits or the high voltage signal, and all belong to the scope of the present application.

In summary, the touch system of the present application utilizes the power supply circuit to effectively improve the SNR of the touch module, and since only the power supply circuit is manufactured under the high voltage process, the manufacturing cost of the touch module under the high voltage process is substantially decreased, and the present application can transform the transmitted signal between the touch module and the host system.

The foregoing is only embodiments of the present application, which is not intended to limit the present application. Any modification following the spirit and principle of the present application, equivalent substitutions, improvements should be included within the scope of the present application.

What is claimed is:

1. A power supply circuit for a touch system, comprising:
a high voltage circuit, configured to provide a high voltage signal;
a first level shifter, connected to the high voltage circuit, configured to transform a level of a first signal transmitted from a touch module to the power supply circuit, and transform the first signal from a signal ground domain into a ground domain; and
a second level shifter, connected to the high voltage circuit, configured to transform a level of a second signal between the touch module and a host system, and transform the second signal from the signal ground domain into the ground domain, and then from the ground domain into the signal ground domain;
wherein the high voltage signal is a floating ground signal and introduced by a finger.

2. The power supply circuit of claim 1, wherein a signal of a ground terminal of the touch module is a high voltage reference signal transmitted from the power supply circuit.

3. The power supply circuit of claim 2, wherein the power supply circuit further comprises an amplifier connected between the first level shifter and the ground terminal of the touch module.

4. The power supply circuit of claim 2, wherein the power supply circuit is configured to provide a power source for the touch module, wherein a fixed level difference exists between the high voltage reference signal of the power supply circuit and a working signal of the power supply circuit.

5. The power supply circuit of claim 1, wherein the power supply circuit further comprises:
an amplifier, connected to the first level shifter, and configured to amplify a voltage of the first signal, and amplify a swing of the first signal to a swing of high voltage; and
a regulator circuit, connected to the amplifier, and configured to regulate the touch module and a voltage of the power supply circuit.

6. The power supply circuit of claim 1, wherein the power supply circuit further comprises a regulator circuit configured to maintain the voltage between the touch module and the power supply circuit.

7. The power supply circuit of claim 1, wherein the first signal is a capacitance variation sensed by a touch sensor of the touch module.

8. A touch system, comprising:
a touch module, configured to generate a signal according to a floating ground signal;
a host system, connected to the touch module, configured to receive the signal transmitted from the touch module; and
a power supply circuit, connected between the touch module and the host system, comprising:
a high voltage circuit, configured to provide a high voltage signal;
a first level shifter, connected to the high voltage circuit, configured to transform a level of a first signal transmitted from the touch module to the power supply circuit, and transform the first signal from a signal ground domain into a ground domain; and
a second level shifter, connected to the high voltage circuit, configured to transform a level of a second signal between the touch module and the host system, and transform the second signal from the signal ground domain into the ground domain, and then from the ground domain into the signal ground domain;
wherein the floating ground signal is a high voltage signal introduced by finger.

9. The touch system of claim 8, wherein a signal of a ground terminal of the touch module is a high voltage reference signal transmitted from the power supply circuit.

10. The touch system of claim 9, wherein the power supply circuit further comprises an amplifier connected between the first level shifter and the ground terminal of the touch module.

11. The touch system of claim 9, wherein the power supply circuit is configured to provide a power source for the touch module, wherein a fixed level difference exists between the high voltage reference signal of the power supply circuit and a working signal.

12. The touch system of claim 8, wherein the power supply circuit further comprises:
- an amplifier, connected to the first level shifter, and configured to amplify a voltage of the first signal, and amplify a swing of the first signal to a swing of high voltage; and
- a regulator circuit, connected to the amplifier, and configured to regulate the touch module and a voltage of the power supply circuit.

13. The touch system of claim 8, wherein the power supply circuit further comprises a regulator circuit configured to maintain the voltage between the touch module and the power supply circuit.

14. The touch system of claim 8, wherein the first signal is a capacitance variation sensed by a touch sensor of the touch module.

\* \* \* \* \*